United States Patent [19]

Wu

[11] Patent Number: 4,883,028

[45] Date of Patent: Nov. 28, 1989

[54] FOOT CONTROLLING ENGINE START, STOP AND BRAKE SYSTEM

[75] Inventor: Gerald P. Wu, Hsinchu, Taiwan

[73] Assignee: Wu's Agriculture Machinery Mfg. Co., Ltd., Hsinchu, Taiwan, Taiwan

[21] Appl. No.: 177,996

[22] Filed: Apr. 5, 1988

[51] Int. Cl.[4] .............................................. F02N 11/08
[52] U.S. Cl. ......................... 123/179 B; 123/198 DC;
                      290/37 A; 290/38 C; 290/38 E
[58] Field of Search ........ 123/179 B, 179 A, 198 DC,
            123/179 BG; 290/37 A, 38 C, 38 E, 38 R

[56] References Cited

U.S. PATENT DOCUMENTS

| | | | |
|---|---|---|---|
| 3,229,792 | 1/1966 | Hock | 123/179 A |
| 3,241,539 | 3/1966 | Kuehn | 123/198 DC |
| 3,872,316 | 3/1975 | Kurii et al. | 123/179 B |
| 4,286,683 | 9/1981 | Zeigner et al. | 123/179 B |
| 4,364,343 | 12/1982 | Malik | 123/179 B |
| 4,482,812 | 11/1984 | Hori et al. | 123/179 B |

FOREIGN PATENT DOCUMENTS

| | | | |
|---|---|---|---|
| 58-38346 | 3/1983 | Japan | 123/179 B |
| 570551 | 12/1975 | Switzerland | 290/38 E |

*Primary Examiner*—Andrew M. Dolinar
*Attorney, Agent, or Firm*—Ladas & Parry

[57] ABSTRACT

A foot controlling engine start, stop and brake system, characterized by a control circuit arranged among an ignition switch, a starter motor, a brake, an accelerator and a generator for controlling automatic stop of the starter motor by feeding back the output voltage of the generator or a frequency (engine speed) enable one to control the engines start, stop and brake by one's foot.

2 Claims, 6 Drawing Sheets

FOOT CONTROLLING ENGINE START, STOP AND BRAKE SYSTEM

FIELD OF THE INVENTION

This invention relates to a foot controlling engine start, stop and brake system.

BACKGROUND OF THE INVENTION

Heretofore, a driver had to manually turn on the ignition switch and pedal the accelerator to start an engine driven vehicle. To stop the vehicle, the driver had to apply the foot brake and the hand brake. Such operations are burdensome and the consequence of an error in operating a vehicle could be serious. Therefore, it has become desirable to provide an improved apparatus to overcome these drawbacks.

SUMMARY OF THE INVENTION

It is an object of the present invention to provide an apparatus which can make the ignition and the brake systems operate in manual or automatic modes, as the user wishes.

In the manual operation, the driver is requested to turn the ignition switch to a START position by use of the ignition key and, at the same time, push the accelerator pedal until the engine is actuated. The ignition switch moves to an ON position automatically as the driver releases the ignition key to disable the starter motor. The engine can be stopped by simply turning the ignition switch to an OFF position.

In the automatic operation, the engine can be made to run by pushing the accelerator pedal and then the starter motor stops automatically. If the ignition switch is provided with a safety device, it is required to turn on the ignition switch before starting the engine. To stop the engine, the driver only needs to release the accelerator pedal and push the brake pedal to a PARK position.

The apparatus according to the present invention has the following advantages.

1. When the vehicle is at rest, the engine can be made to run by powering up the circuit of the starter motor to activate the starter motor. Once the engine begins running, the circuit is cut off and the starter motor is disabled automatically. Then, the vehicle begins to move if the driver keeps pressure on the accelerator pedal. If the engine is not activated within 3 seconds (which is adjustable from 2 to 10 seconds according to the practical requirement) from the operation of the starter motor, the circuit of the starter motor is cut off automatically. In this case, it is necessary to release the accelerator pedal and await a complete stop of the engine. Then repeat the foregoing steps until the engine begins to run.

2. The brake system of the present invention is divided into two parts. The front part functions in the same manner as the common foot brake, but the rear part can serve as the ignition switch and the hand brake. Namely, applying pressure to the front part of the brake will brake the vehicle only but the engine is not stopped; while applying pressure to the rear part of the brake can stop the engine and the vehicle similar to the hand brake.

DESCRIPTION OF THE PREFERRED EMBODIMENTS

Figure 1:
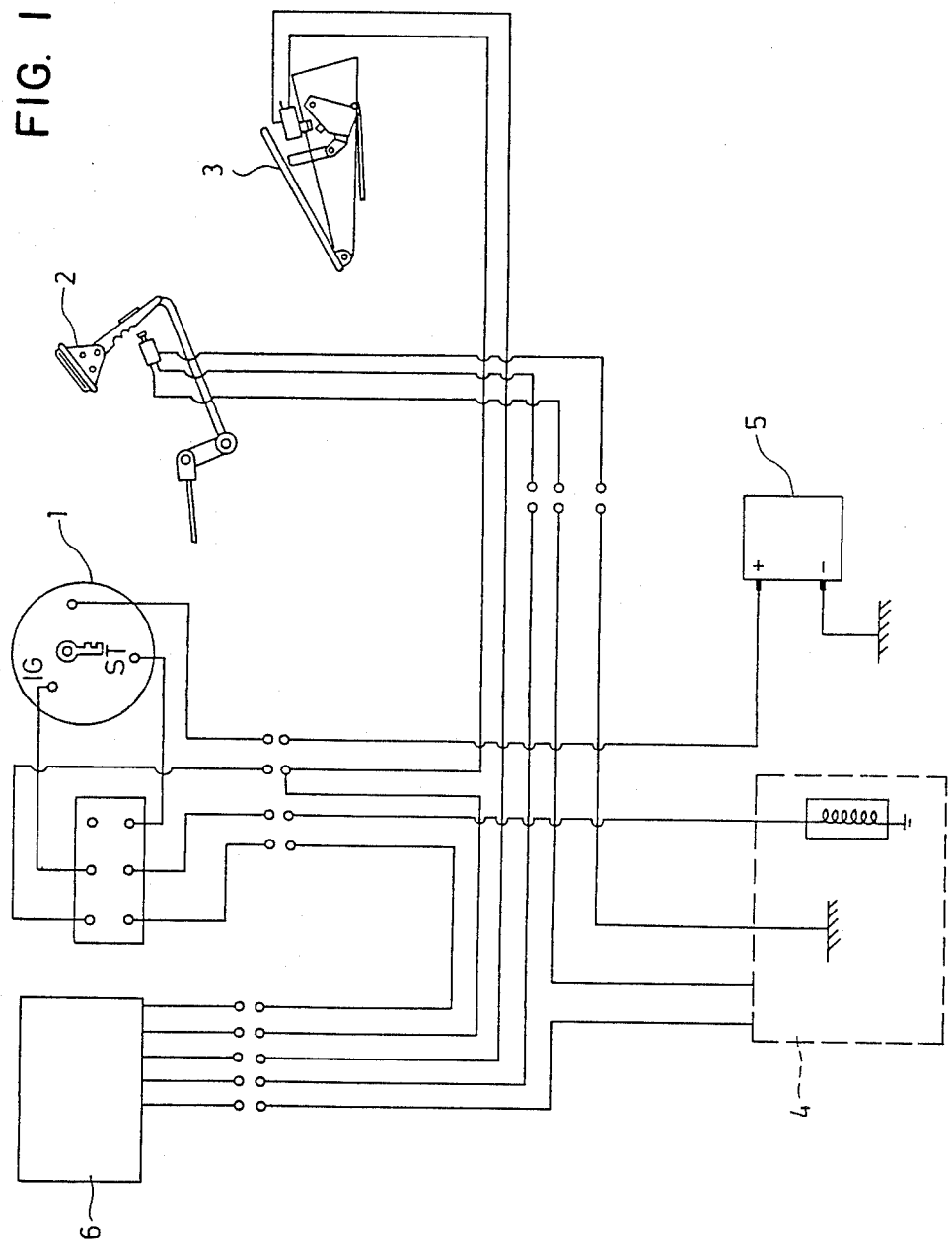
FIG. 1 is a schematic circuit diagram of a system embodying the present invention.

As shown in FIGS. 1 to 12, the foot controlling engine start, stop and brake system of the invention is mainly directed to a control circuit arranged among an ignition switch 1, a brake pedal 2, an accelerator pedal 3 and a generator 4 for effecting automatic stop of a starter motor M based on the output voltage 13 of the generator 4 or frequency (engine speed) in the feedback manner. The operation of the feedback control circuit is now described as follows.

Figure 2:
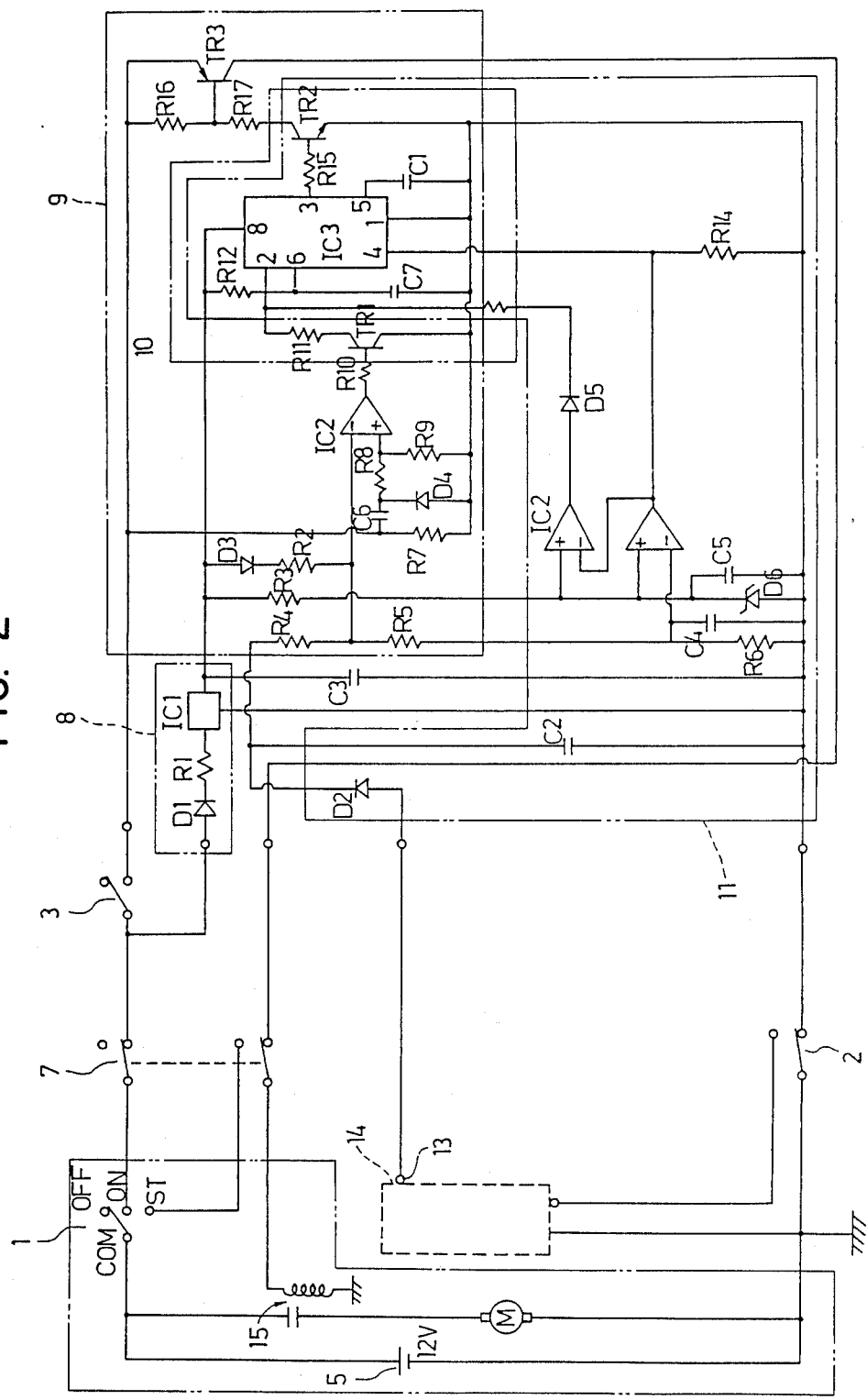
FIG. 2 is a detailed circuit diagram of the system in FIG. 1 for controlling automatic stopping of the starter motor by feeding back the output voltage of the generator.
Figure 3:
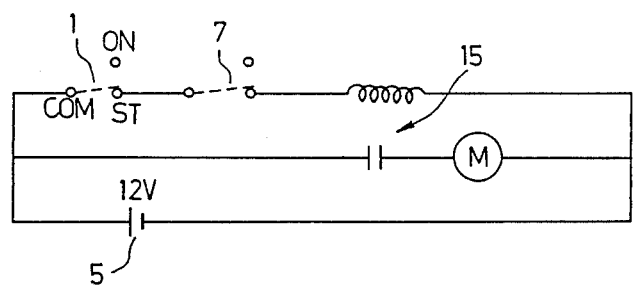
FIG. 3 is a partial circuit diagram of the system in FIG. 2 showing the ignition switch in the manual position.

Referring to FIGS. 2 and 3, the feedback control circuit for automatically stopping the starter motor M by use of the output voltage of the generator 4 comprises an automatic and manual switch 7, a voltage regulator 8, a trigger 9, a timer 10, a feedback controller 11 and a stop circuit 12.

When the automatic and manual switch 7 is in the manual position, the coil of a relay 15 is directly connected to the ST contact of the ignition switch 1 as shown in FIG. 3. Therefore, by turning the ignition (in FIG. 3., by turning the ignition key) to the ST contact, the relay 15 is energized to activate the starter motor M and, in turn, the engine 14.

Figure 4:
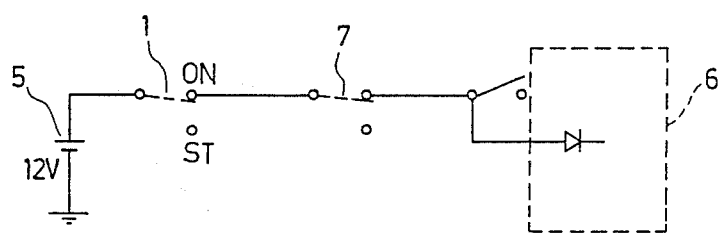
FIG. 4 is a partial circuit diagram of the system in FIG. 2 showing the ignition switch in the automatic position.

On the other hand, when the switch 7 is in the automatic position, the ST contact is inactive and a battery 5 supplies a voltage to a PC board 6 through an automatic switch SW 2 as shown in FIG. 4.

Figure 5:
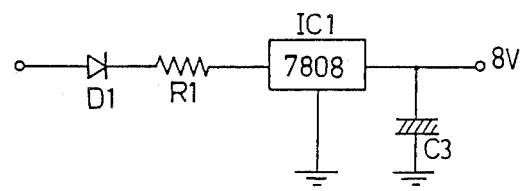
FIG. 5 is a circuit diagram of the voltage regulator of the system in FIG. 2.

Referring to FIG. 5, the power supplied to the PC board 6 is regulated through a diode D1, a resistor R1 and a voltage regulation IC 7808 to generate a regulated voltage of 8 V as the operation voltage of the PC board, so that it is not influenced by a variation in the external voltage.

Figure 6:
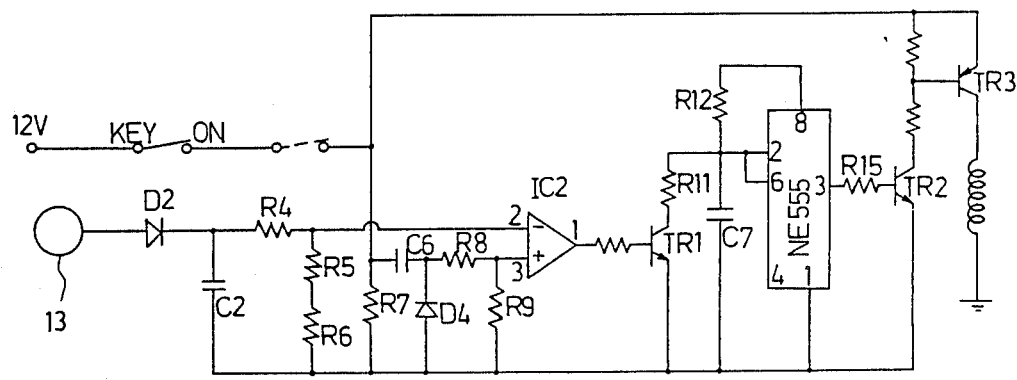
FIG. 6 is a circuit diagram of the trigger of the system in FIG. 2.
Figure 7:
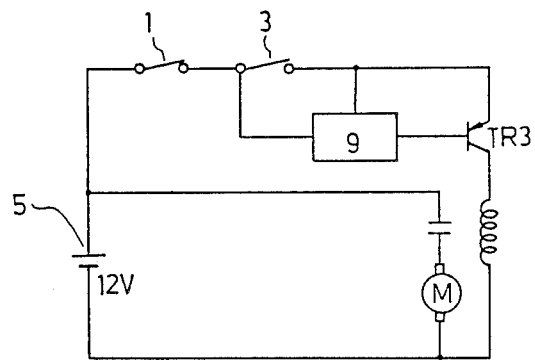
FIG. 7 is a partial circuit diagram of the system in FIG. 2 showing activation of the starter motor.

Referring to FIG. 6, by pushing on the accelerator 3 when the engine 14 is not in operation, a 12 V voltage is subject to differentiation by C6 so that the output of IC2 is high because the voltage appearing at pin 3 is larger than that of pin 2. Hence, the transistor TR1 is conductive and the capacitor C7 discharges via R11 and TR1, triggering IC3, i.e. NE555, to have its output at pin 3 high. As a result, TR2 and TR3 are both conductive, and the 12 V voltage is supplied to the relay 15 through the ignition switch 1, the accelerator 3 and the transistor TR3 as shown in FIG. 7. The energization of the relay 15 activates the starter motor M and, in turn, the engine 14.

If the engine 14 is already in operation, the output voltage 13 from the generator 4 is supplied to IC2 at pin 2 after having been rectified and filtered by D2 and C2 so that the output of IC2 is low because the voltage appearing at pin 2 is larger than at pin 3. As a result, the transistor TR3 is not conductive. In other words, if the engine 14 is already in operation, the starter motor M cannot be activated any longer by further pushing of the accelerator.

Figure 8:
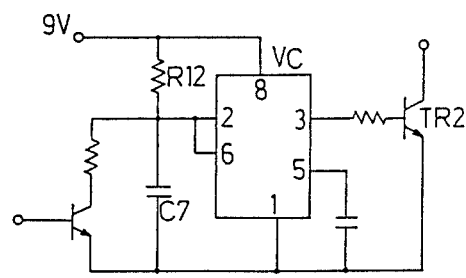
FIG. 8 is a circuit diagram of the timer of the system in FIG. 2.

FIG. 8 shows a circuit of the timer 10. The starter motor M stops operating within at least 3 seconds (which is adjustable) after having been energized. When the accelerator 3 is switched on, the capacitor C7 discharges and is then charged through R12. The output at pin 3 of NE555 becomes low as C7 is charged to ⅔ Vc. At this moment, the transistors TR2 and TR3 are not conductive and the relay 15 is OFF, cutting off the power to the starter motor M.

The operating duration of the starter motor M depends on the time constant of the resistor R12 and the capacitor C7. Namely, the operating duration can be changed by adjusting the value of R12 or C7.

Figure 9:
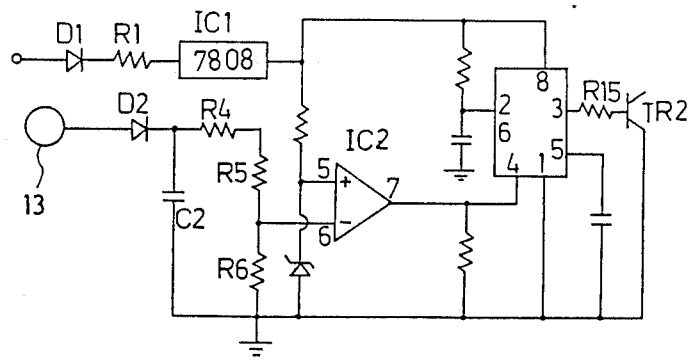
FIG. 9 is a partial circuit diagram of the system in FIG. 2 showing the automatic stopping of the starter motor in the feedback manner by use of the voltage output from the generator after the engine is made to run.

FIG. 9 shows the circuit 11 for automatically stopping the starter motor as the engine 14 begins running. According to the relationship of the engine speed being proportional to the generator voltage, the output voltage of the generator 4 as the engine 14 begins running is obtained and compared with a predetermined reference voltage. If the voltage at pin 6 of IC2 is higher than the reference voltage at pin 5 after the engine 14 has been activated, the output at pin 7 is low and so is the voltage level at pin 4 (reset) of IC3 (IE 555). Due to the feature of IC3, the output at pin 3 is low, also. In consequence, TR2 and TR3 are not conductive, the relay 15 is off, and the starter motor stops operating.

The activation of the engine 14 can be detected based on the voltage picked up from the generator 4.

Figure 10:
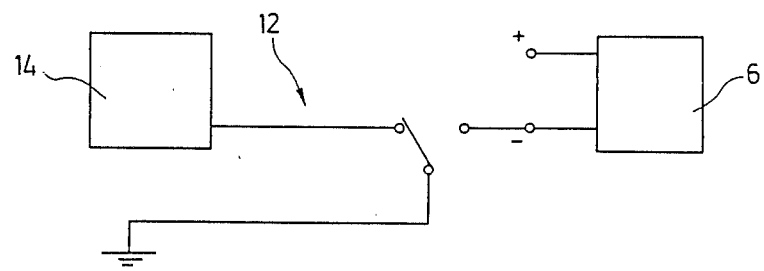
FIG. 10 is a circuit diagram of the engine stop part of the system in FIG. 2.

FIG. 10 is a diagram of the stop circuit 12. By applying the brake 2, the stop wire is grounded so as to stop the engine 14 and cut off the power to the PC board 6.

Figure 12:
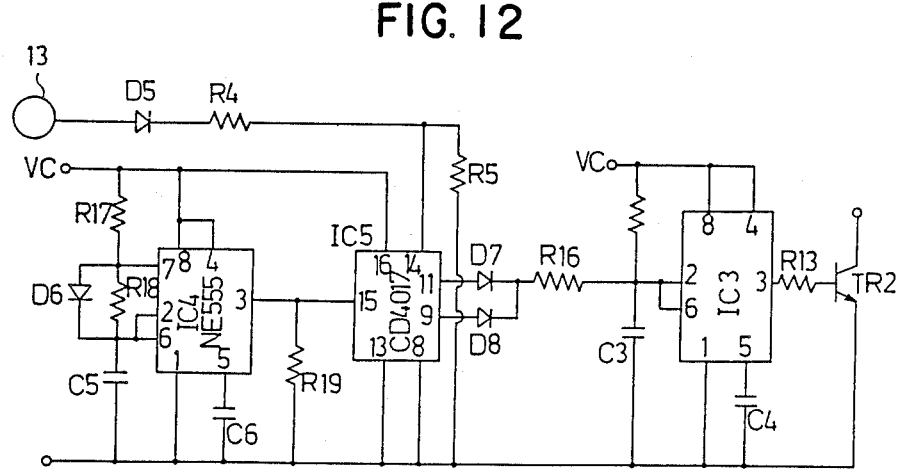
FIG. 12 is a partial circuit diagram of the system in FIG. 11 showing automatic stopping of the starter motor under the control of the frequency of engine speed.
Figure 11:
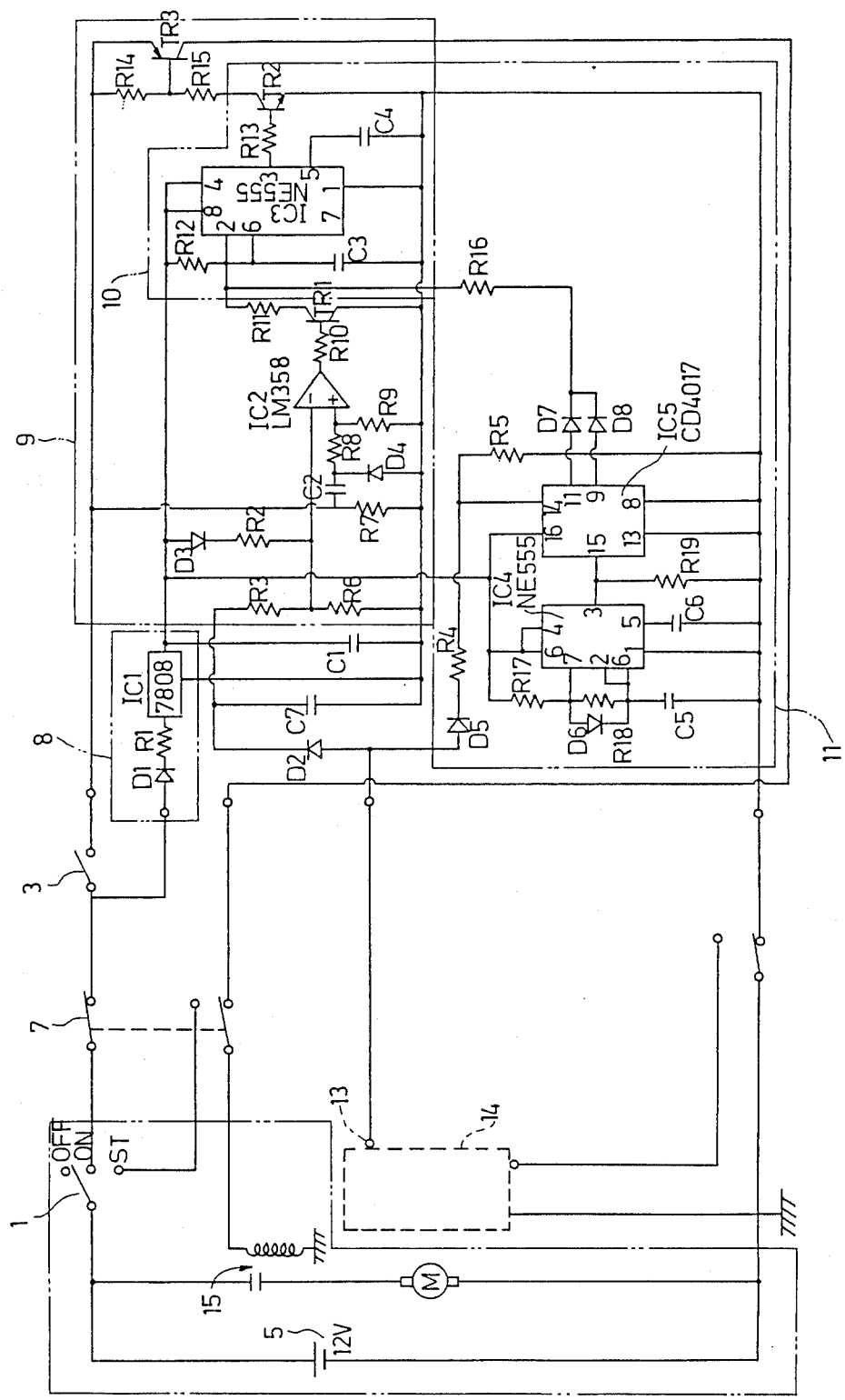
FIG. 11 is a detailed circuit diagram of the system in FIG. 1 for controlling automatic stop of the starter motor by feeding back the output frequency of the generator.

Now, referring to FIGS. 11 and 12, the feedback control circuit for automatically stopping the starter motor M by use of frequency (engine speed) comprises an automatic and manual switch 7, a voltage regulator 8, a trigger 9, a timer 10, a feedback controller 11 and a stop circuit 12.

When the automatic and manual switch 7 is in the manual position, the power is directly supplied to the coil of the relay 15 by turning the ignition key to the ST contact to activate the starter motor M and, in turn, the engine 14 as shown in FIG. 3.

On the other hand, when the switch 7 is in the automatic position, the ST contact is inactive and the power is supplied to the PC board 6 through the automatic switch SW 2 a shown in FIG. 4.

Referring to FIG. 5, the power supplied to the PC board 6 is regulated through the diode D1, the resistor R1 and the voltage regulation IC 7808 to generate a regulated voltage of 8 V as the operation voltage of the PC board.

Referring to FIG. 6, by pushing the accelerator 3 when the engine 14 is not in operation, a 12 V voltage is subject to differentiation by C2 so that the output of IC2 is high because the voltage appearing at pin 3 is larger than that of pin 2. Hence, the transistor TR1, triggering IC3, i.e. NE555, to have its output at pin 3 high. As a result, TR2 and TR3 are both conductive, and the 12 V voltage is supplied to the relay 15 through the ignition switch 1, the accelerator 3 and the transistor TR3 as shown in FIG. 7. The energization of the relay 15 activates the starter motor M and, in turn, the engine 14.

If the engine 14 is already in operation, the output voltage 13 from the generator 4 is supplied to IC2 at pin 2 after having been rectified and filtered by D2 and C2 so that the output of IC2 is low because the voltage appearing at pin 2 is larger than at pin 3. As a result, the transistor TR3 is not conductive. In other words, if the engine 14 is already in operation, the starter motor M cannot be activated any longer by further pushing on the accelerator.

As shown in FIG. 8, when the accelerator 3 is switched on, the capacitor C3 discharges through R11 and TR1 so that the output at pin 3 of IC3, i.e. NE555, is high. At the same time, C3 is charged through R12 again. The output at pin 3 of NE555 becomes low as C3 is charged to ⅔ Vc. Therefore, the transistors TR2 and TR3 are not conductive and the relay is OFF, cutting off the power to stop the starter motor M. A trigger cycle is thus completed. The period is the time constant of R12 and C3. Namely, the operating time of the starter motor M can be adjusted by changing the value of R12 or C3.

FIG. 12 shows the circuit 11' for automatically stopping the starter motor as the engine 14 begins running.

The frequency of the generator 4 is 23 Hz at the moment that the starter motor M is activating the engine 14. Then, it increases to at least 44 Hz after the engine has been activated.

The circuit 11' thus controls the stoppage of the starter motor M by use of the feedback frequency.

IC4 (NE555) generates a pulse train having a period of about 200 ms to reset IC5. IC5, which is CD4017 in this embodiment, can count pulses. If there are 8 pulses during 200 ms, namely, the frequency is 40 Hz, CD4017 outputs a signal to IC3 at pin 2 and pin 6 through D8 or D7 and R16, so that the capacitor C3 is charged to ⅔ Vc rapidly and the output of IC3 at pin 3 becomes low.

Therefore, TR2 and TR3 are not conductive, the relay 15 is deenergized, and the starter motor M stops.

If the engine 14 has been activated by pushing the accelerator 3, the starter motor M stops automatically. If the engine 14 is not activated, the starter motor M also stops 3 seconds later (which is adjustable) under the control of the timer 10. In this case, it is necessary to push the accelerator 3 again to activate the starter motor M.

As shown in FIG. 10, by applying the brake 2, the stop wire is grounded so as to stop the engine 14 and cut off the power to the PC board 6.

I claim:
1. A brake pedal activated engine controlling means comprising:

a control circuit associated with an ignition switch;
a starter motor;
a brake;
an accelerator;
and a generator for controlling the automatic stopping of said starter motor by feeding back the output voltage of said generator, said control circuit comprising an automatic and manual switch for automatically or manually controlling said starter motor and said engine;
a regulator for providing a regulated voltage by means of an IC1;
a trigger having an IC2 for effecting discharge-triggering by means of a first transistor and rendering an IC3 providing a first desirable voltage to control activation of said starter motor and, in turn, said engine, so that said generator outputs a second desirable voltage to said IC2 to make a second transistor non-conductive and therefore said starter motor cannot be activated by pushing said accelerator when said engine is in operation;
a timer for automatically stopping said starter motor within 3 seconds from triggering;
a feedback controller having a plurality of ICs for stopping said starter motor when said engine is shown by said second voltage picked up from said generator to be running; and
a stop circuit for grounding a stop wire, said stop circuit being activated by the application of pressure on said brake pedal so as to stop said engine and cut off power to said ICs.

2. A brake pedal activated engine controlling means comprising:
a control circuit associated with an ignition switch; a starter motor; a brake; an accelerator; and a generator for controlling the automatic stopping of said starter motor by feeding back the engine speed frequency, said control circuit comprising:
an automatic and manual switch for automatically and manually controlling said starter motor and said engine;
a regulator for providing a regulated voltage by means of an IC1;
a trigger having an IC2 for affecting discharge-triggering by means of a first transistor and rendering an IC3 providing a first desirable voltage to control the activation of said starter motor and, in turn, said engine, so that said generator outputs a second desirable voltage to said IC2 to make a second transistor non-conductive and therefore said starter motor cannot be activated by pushing on said accelerator when said engine is in operation;
a timer for automatically stopping said starter motor within 3 seconds from triggering;
a feedback controller having a plurality of ICs for stopping said starter motor when said engine is detected by feedback of engine speed frequency to be running; and
a stop circuit for grounding a stop wire when pressure is applied to said brake pedal so as to stop said engine and cut off power to said ICs.

* * * * *